(12) United States Patent
Biehler

(10) Patent No.: US 11,598,262 B2
(45) Date of Patent: Mar. 7, 2023

(54) INTAKE DUCT FOR A GAS-FUELLED OR DIESEL-FUELLED TURBINE EQUIPPED WITH A WATER SATURATION STRUCTURE

(71) Applicant: GE ENERGY PRODUCTS FRANCE SNC, Belfort (FR)

(72) Inventor: Pierre Biehler, Belfort (FR)

(73) Assignee: GE ENERGY PRODUCTS FRANCE SNC, Belfort (FR)

( * ) Notice: Subject to any disclaimer, the term of this patent is extended or adjusted under 35 U.S.C. 154(b) by 288 days.

(21) Appl. No.: 16/609,557

(22) PCT Filed: May 2, 2018

(86) PCT No.: PCT/FR2018/051088
§ 371 (c)(1),
(2) Date: Oct. 30, 2019

(87) PCT Pub. No.: WO2018/202993
PCT Pub. Date: Nov. 8, 2018

(65) Prior Publication Data
US 2020/0149473 A1 May 14, 2020

(30) Foreign Application Priority Data

May 3, 2017 (FR) ..................... 1753880

(51) Int. Cl.
*F02C 7/04* (2006.01)
*F02C 7/143* (2006.01)
*F02C 3/30* (2006.01)

(52) U.S. Cl.
CPC ............... *F02C 7/04* (2013.01); *F02C 3/305* (2013.01); *F02C 7/1435* (2013.01);
(Continued)

(58) Field of Classification Search
CPC .... F02C 7/04; F02C 3/30; F02C 3/305; F02C 7/00–057; F02C 7/1435; F02C 7/20;
(Continued)

(56) References Cited

U.S. PATENT DOCUMENTS 5,867,977 A 2/1999 Zachary et al.
5,944,483 A * 8/1999 Beck .................... F01D 25/002
415/117

(Continued)

OTHER PUBLICATIONS

International Search Report dated Aug. 10, 2018.

*Primary Examiner* — Stephanie Sebasco Cheng
(74) *Attorney, Agent, or Firm* — Ipsilon USA, LLP

(57) ABSTRACT

The invention concerns an air inlet duct (10) for a compressor (12) of a gas or fuel oil turbine, including:
two transition sections (S3, S4) in fluid communication with one another for the circulation of a flow of air through said sections (S3, S4), each of said sections (S3, S4) being self-supporting,
a structure (20) for injecting a mist of liquid particles, configured to be disposed between said sections (S3, S4) and in contact with said sections (S3, S4), the structure (20) being removable independently of demounting said sections (S3, S4).

(Continued)

The invention also concerns a gas or fuel oil turbine assembly comprising an inlet duct (10) of this type and a method of maintaining an inlet duct (10) of this type.

12 Claims, 4 Drawing Sheets

(52) U.S. Cl.
CPC ...... *F05D 2220/32* (2013.01); *F05D 2230/60* (2013.01); *F05D 2230/64* (2013.01); *F05D 2230/70* (2013.01); *F05D 2230/72* (2013.01)

(58) Field of Classification Search
CPC ............. F05D 2230/21; F05D 2230/52; F05D 2230/60–80; F05D 2270/16; F05D 2260/212; F05D 2240/90–91; F05D 2260/30–31; F05D 2260/36; F05D 2260/38; F01D 25/002; F01D 25/28–285; B64D 33/00–02; B64D 2033/0206–0293; B01D 45/10; B01D 47/06–085; B01D 23/205; B01D 2024/125; B01D 2024/145; B01D 2024/162

See application file for complete search history.

(56) References Cited

U.S. PATENT DOCUMENTS

| | | | |
|---|---|---|---|
| 6,449,957 B1* | 9/2002 | Takamatsu | F01D 25/28 60/801 |
| 7,204,670 B1* | 4/2007 | Meher-Homji | F04D 29/701 415/116 |
| 7,703,272 B2* | 4/2010 | Wagner | F02C 7/1435 60/39.53 |
| 10,722,990 B2* | 7/2020 | Parmeshwar | B23P 15/04 |
| 2007/0113561 A1* | 5/2007 | Bolis | F02C 7/1435 60/39.53 |
| 2008/0250769 A1 | 10/2008 | Wagner et al. | |
| 2010/0326083 A1* | 12/2010 | Bland | F02C 7/143 60/39.53 |
| 2016/0186602 A1* | 6/2016 | Saenz | F04D 29/705 222/1 |
| 2017/0321700 A1 | 11/2017 | Merchant et al. | |
| 2020/0157969 A1* | 5/2020 | Park | F02C 7/00 |

* cited by examiner

INTAKE DUCT FOR A GAS-FUELLED OR DIESEL-FUELLED TURBINE EQUIPPED WITH A WATER SATURATION STRUCTURE

RELATED APPLICATION

This application is a National Phase of PCT/FR2018/051088 filed on May 2, 2018, which claims the benefit of priority from French Patent Application No. 17 53880 filed on May 3, 2017, the entirety of which are incorporated by reference.

The present invention concerns the field of gas turbines, more particularly single or combined cycle gas turbines comprising an air inlet duct connected to a volumetric compressor and a water saturation system in the air at the inlet of said compressor.

DESCRIPTION OF THE RELATED ART

A gas turbine generally comprises an air intake system, a compressor, a gas or fuel oil combustion system, an expansion turbine and a combustion gas exhaust system possibly connected to a heat recovery boiler and a steam turbine. The hot gases resulting from burning the gas or the fuel oil and air under pressure coming from the compressor is used in the expansion turbine to convert the kinetic energy of the gas into mechanical energy to drive the compressor and to generate a mechanical torque useful for example to cause an alternator to rotate to supply electricity to an electrical network.

The power and the efficiency of gas and fuel oil turbines are dependent on ambient conditions such as temperature, pressure and relative humidity that affect the capacity of the compressor to compress air. In particular, an increase in ambient temperature leads to a reduction of the power and the efficiency of the gas or fuel oil turbine caused by a reduction of the density of the air, which results in a reduction of the potential mass flow rate at the outlet of the compressor. Moreover, as the gas or fuel oil turbine is a machine of constant volumetric throughput at a given rotation speed, if the mass flow rate of air decreases the total power generated also decreases. The total power generated by the turbine depends as much on the compressor power as on the air mass flow rate whereas the efficiency is not affected by the mass flow rate and the increase in the ambient temperature will therefore affect the power more than the efficiency.

Moreover, depending on the characteristics of the network to which the turbine is connected, it may be necessary to increase the power generated in a very short time period, for example if the frequency of the network tends to decrease because of a sudden increase in the demand for electricity or a reduction of the power of the electrical generators feeding the network.

Wet compression is one solution enabling the power generated by a gas turbine to be increased by injecting a mist of water particles at the inlet of the compressor up to a water/air ratio of 2% or by injecting steam under pressure. This operation enables reduction of the temperature of the flow of air by extracting from the latter the heat to evaporate the water. During wet compression the air is therefore cooled and its density increased as is the mass flow rate of air at the outlet of the compressor.

The air is generally saturated with water in the form of a mist of fine droplets at the inlet of or in the intermediate stages of the compressor. The size of the droplets must be of the order of 20-50 microns on the one hand to facilitate fast evaporation and on the other hand to prevent erosion of the blades of the compressor. Fast evaporation of the droplets (in approximately 10 milliseconds) inside an axial compressor enables the compressor to increase the air mass flow rate whilst reducing the energy or the work necessary for decompression, which increases the net power generated by the expansion turbine. Reducing the compression work enables the net power of the turbine to be increased, as one sixth (i.e. $\frac{2}{3}$-$\frac{1}{2}$) of the power generated by the expansion turbine is used for the compression. For example, wet compression with a water/air ratio of 1.75% enables a 13% increase in the fuel flow rate without increasing the flame temperature and the total power to be increased 18%.

Moreover, temperature changes during a day or a given time period oblige adjustment of the quantity of water to be injected as a function of temperature and the load of the machine in order to achieve saturation or supersaturation of water in the air.

These systems generally comprise an ambient conditions monitoring station, a controller, a source of demineralized water, feed pipes, control and isolating valves, a pump for compressing the water and a support structure with one or more atomization nozzles placed inside the air intake circuit.

The document US 2014/0069076 describes the use of electrohydrodynamic injectors to generate a water mist in order to reduce the temperature of the air in the inlet duct of a gas turbine. The document U.S. Pat. No. 6,553,768 proposes use of dual injectors for the requirements of washing the compressor and wet compression using electromechanical injectors such as ultrasound atomization or atomization by vibro-capillarity.

In the case of an air inlet duct having a geometry with transition sections passing from a horizontal plane to a vertical plane the maximum speed of the flow of air through the inlet duct is lower at the level of the bend formed by the transition from the horizontal plane to the vertical plane. It is therefore possible to increase the flow rate of water in this high-speed zone of the flow of air. The distribution and density of the nozzles are therefore proportional to the air speed profile in the duct in order to ensure homogeneous distribution of the droplets in a plane transverse to the inlet duct and a uniform temperature of the blades of the compressor.

In order to cover different water injection flow rate ranges enabling saturation as a function of the temperature and the relative humidity of the air a plurality of injectors may be used to form a plurality of circuits provided with different pumps.

A major disadvantage of using atomization nozzles for cooling air by evaporation and wet compression is the high rate of abrasion of the atomization nozzles. In fact, the high speeds of the jet passing through them causes high wear of the atomization nozzles that necessitates maintenance or regular replacement of the atomization nozzles. Now, until now no satisfactory solution has been developed to facilitate the maintenance or the replacement of these nozzles.

OBJECT AND SUMMARY

An objective of the present invention is to facilitate the operations of maintaining and replacing the water mist generation nozzles in the flow of air in an inlet duct of a gas or fuel oil turbine.

To this end the invention concerns an air inlet duct for a compressor of a gas or fuel oil turbine, including:
- two transition sections in fluid communication with one another for the circulation of a flow of air through said sections, each of said sections being self-supporting,
- a structure for injecting a mist of liquid particles, configured to be disposed between said sections and in contact with said sections, the structure being removable independently of demounting said sections.

The fact that the two sections are self-supporting enables those sections to be retained in their operating position when it is wished to remove the structure. This facilitates replacing the structure to replace it or to maintain it because retaining the two sections in the operating position is not dependent on the position of the structure. The operations of maintaining and replacing nozzles if any mounted on the structure can therefore be facilitated.

According to one possible feature of the inlet duct, one of the sections is disposed upstream of the other section relative to the direction of circulation of the air inside the inlet duct.

According to one possible feature of the inlet duct, said sections define an air passage duct through the inlet duct, the structure and said sections being configured to form an at least partly empty space between said sections when at least a part of the structure is disposed outside the air passage duct.

According to one possible feature of the inlet duct, the structure and said sections are configured to form a completely empty space between said sections when the structure is disposed outside the air passage duct.

According to one possible feature of the inlet duct, the structure comprises first and second elements disposed transversely relative to the air passage duct, the first element comprising means for injecting a mist of liquid particles and being configured to be fixed to one of said sections, the second element being configured to be fixed on the one hand to the first element and on the other hand to the other of said sections, and in which the first and second elements are configured to form an at least partly empty space between the first element and one of said sections when the second element is disposed outside the air passage duct.

According to one possible feature of the inlet duct, the first element includes a frame, at least one injection nozzle fixed to the frame to generate a mist of liquid particles in the inlet duct and at least one pressurized liquid feed pipe connected to the nozzle, the second element being a removable spacer.

According to one possible feature of the inlet duct, the first element is able, after the spacer is positioned outside the air passage duct, to be moved in a first movement direction and then a second movement direction to detach the first element from one section or where applicable the other section to which it is fixed.

According to one possible feature of the inlet duct, the air passage duct defines a direction of circulation of a flow of air through the inlet duct, the first movement direction extending substantially along the circulation direction and the second movement direction extending substantially transversely relative to the circulation direction.

According to one possible feature of the inlet duct, the latter includes removable guide means adapted to be inserted in the empty space formed by the second element to guide the first element in the first movement direction and/or the second movement direction.

According to one possible feature of the inlet duct, one of said sections comprises:
- a hollow body enabling a flow of air to pass through it;
- retaining means forming a projection extending out of the hollow body;
- a support configured to cooperate with the retaining means to transmit the load from said section to the ground.

According to one possible feature of the inlet duct, the support is a gas turbine protection thermo-acoustic enclosure or a portion of a structure of a building in which the gas turbine and the inlet duct are placed or a framework.

The invention also concerns a method of maintaining a structure of an inlet duct as described hereinabove comprising the steps consisting in:
- removing the second element so as to leave an empty space between the first element and one section or where applicable the other section,
- moving the first element in the first movement direction so as to detach the first element from said second section or where applicable said other section to which it is fixed,
- moving the first element in the second movement direction so as to position the first element at least partly outside the air passage duct.

According to one possible feature of the maintenance method, the latter further comprises, before the steps of moving the first element, a step consisting in installing guide means in the empty space left by the spacer, the framework being moved in the second movement direction in contact with the guide means.

According to one possible feature of the maintenance method, the latter further comprises a step of replacing the at least one nozzle when the framework is positioned outside the air passage duct.

The invention also concerns a gas or fuel oil turbine assembly comprising:
- an air inlet duct according to any one of the preceding claims,
- a compressor connected to the inlet duct to receive air therefrom,
- a combustion chamber for mixing and burning a fuel and air compressed by the compressor,
- an expansion turbine adapted to be driven in rotation by hot gases from the combustion chamber, and
- an alternator coupled to the expansion turbine to generate electricity.

BRIEF DESCRIPTION OF THE DRAWINGS:

Other features and advantages of the invention will appear on reading the following description of preferred embodiments of the invention given by way of example and with reference to the appended drawings.

DETAILED DESCRIPTION

Figure 1:
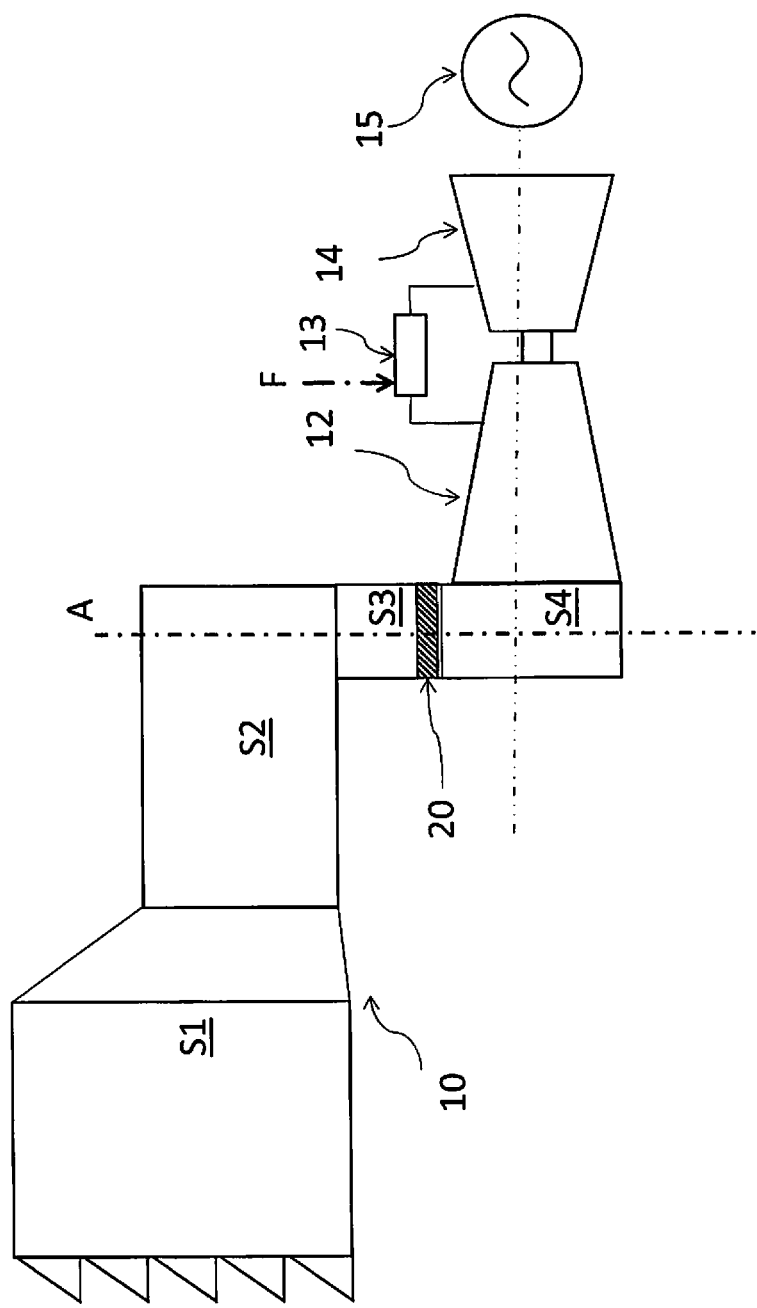
FIG. 1 represents a side view of an air inlet duct according to one embodiment of the invention associated with a gas or fuel oil turbine.

FIG. 1 represents a system for gas turbines comprising an air inlet duct 10, a compressor 12 connected to the inlet duct 10 to receive air coming the latter, a combustion chamber 13 for mixing and burning the air compressed by the compressor 12 and a fuel F such as gas or fuel oil. The gas or fuel oil turbine assembly also comprises an expansion turbine 14 adapted to be driven in rotation by hot gases coming from the combustion chamber 13 and an alternator 15 coupled to the expansion turbine to generate electricity and supply it in a network. The invention concerns in particular an inlet duct 10 as described hereinafter and an assembly for gas or fuel oil turbines comprising an inlet duct 10 of this kind.

According to one embodiment of the invention the air inlet duct 10 comprises at least two transition sections in fluid communication with one another for the circulation of a flow of air through these sections. The supply duct 10 may include more than two transition sections, for example four, six, eight or ten transition sections.

In the embodiment represented in FIG. 1 the air inlet duct 10 comprises four transition sections: a first section S1 that may comprise water retention, particle retention, flow rate and pressure measurement devices, a second transition section S2 that may comprise one or more silencers, a third transition section S3 that may comprise one or more temperature sensors, and a fourth section S4, known as the intake Plenum, connected directly to the inlet of the compressor 12. This fourth transition section S4 may comprise a system for washing the compressor 12 and for measuring temperature (not represented). In the embodiment from FIG. 1 the inlet duct 10 forms a cranked circuit extending substantially horizontally in a first part comprising the first section S1 and the second section S2 and extending substantially vertically in a second part comprising the third section S3 and the fourth section S4. In particular, the third section S3 and the fourth section S4 are disposed one above the other along a substantially vertical axis, the third section S3 being disposed above the second section S4. The supply duct 10 may have any shape or direction of extension enabling air to be supplied to the compressor 12 via the third transition section S3 and the fourth transition section S4. The third section S3 is therefore generally disposed upstream of the fourth section S4 relative to the direction of circulation of the air inside the inlet duct 10.

The third section S3 and the fourth section S4 define an air passage duct across the supply duct 10 extending in a circulation direction A of the flow of air through the third section S3 and the fourth section S4. For example, the direction of circulation A is therefore substantially vertical when the third section S3 and the fourth section S4 are substantially vertical. In a similar manner, the direction of circulation A is substantially horizontal when the third section S3 and the fourth section S4 are substantially horizontal.

To reduce the temperature of the air circulating inside the supply duct 10 the latter further comprises a structure 20 for injecting a mist of liquid particles configured to be disposed in contact with and between the third section S3 and the fourth section S4. This position is chosen so as to have a velocity of the flow of air on the one hand enabling homogenization of the temperature and on the other hand ensuring entry of the water mist as close as possible to the compressor 12 to enable the water to evaporate in order to increase the mass flow rate of air at the outlet of the compressor 12. Alternatively, the structure 20 may be disposed between two consecutive sections of the supply duct 10 other than the third section S3 and the fourth section S4. Also, the structure 20 is disposed between the third section S3 and the fourth section S4 in a removable manner in order to enable maintenance of the injection means present inside the structure 20. In particular, the structure 20 is removable independently of demounting the third section S3 and the fourth section S4. In other words, the structure 20 may be removed from the passage duct without demounting or moving the third section S3 and/or the fourth section S4. The structure 20 is placed in a substantially transverse manner to the flow of air in the inlet duct 10.

Any liquid for cooling the air in the inlet duct 10 by evaporating quickly may be used. The liquid used is preferably water, however. In this case the structure 20 is configured to inject into the inlet duct 10 water in the form of a mist of fine droplets with a diameter of the order of 20 to 50 microns.

Each of the third section S3 and the fourth section S4 is made self-supporting to enable them to be retained in position. In other words, each of the third section S3 and the fourth section S4 is capable of supporting its own load independently of the other sections present in the inlet duct. If the first section S1, second section S2 and fourth section S4 were demounted and removed from the inlet duct, the third section S3 would be then able to remain in its operating position. This facilitates replacing the structure 20 for its replacement or maintenance because the latter does not support the load of the third section S3. In fact, in a known configuration of an inlet duct in which the third section S3 is not self-supporting the load of the third section S3 may be supported by the structure 20 and the fourth section S4, which makes removing the structure 20 difficult and laborious.

To enable the third section S3 to be self-supporting the latter may comprise a hollow body enabling the flow of air to pass through the third section, retaining means 30 forming a projection extending outside the hollow body, and a support 40 configured to cooperate with the retaining means 30 to transmit the load of the third section S3 to the ground (see FIGS. 3b to 3d and FIG. 4). In particular, the retaining means 30 and the support 40 may transmit the load, or the weight, of the third section S3 to the ground in a direct or indirect manner. In other words, the support 40 may rest directly on the ground or on a member resting on the ground other than one of the transition sections of the inlet duct 10. The support 40 is preferably a gas turbine protection thermoacoustic enclosure or a portion of a structure of a building in which the gas turbine and the inlet duct 10 are placed or a framework. For example, the retaining means 30 may be angle brackets formed on the hollow body and enabling transmission of the load of the hollow body by virtue of fixing to or bearing on the support 40.

Also, at least the first two sections S1 and S2 are supported by a metal framework (not represented) and the fourth section S4 is preferably supported on the ground.

To facilitate further replacing and maintaining the structure 20, the third section S3 and the fourth section S4 as well as the structure 20 may be configured to form an at least partly empty space between the third section S3 and the fourth section S4 if at least a part of the structure 20 is disposed outside the air passage duct. By "partly empty space" is meant that the space between the third section S3 and the fourth section S4 is partly uncovered or occupied. The space may therefore be partly empty so that the same element of the structure 20 is disposed both partly inside the air passage duct and partly outside the latter. Alternatively, the space may be partly empty so that a first element of the structure 20 is disposed entirely inside the passage duct and a second element of the structure 20 distinct from the first element is disposed entirely outside the passage duct. The partly empty space therefore enables improved access to the structure 20, for example for various demounting and guiding tools, in such a manner as to proceed more easily to withdrawing the structure 20. To improve further access to the structure 20, the latter and the third section S3 and the fourth section S4 are preferably configured to form a totally empty space between the third section S3 and the fourth section S4 when the structure 20 is disposed outside the air passage duct. By "completely empty space" is meant that the whole of the cross section of the supply duct 10 disposed between the third section S3 and the fourth section S4 is uncovered or unoccupied. In other words, the completely empty space renders the supply duct 10 discontinuous between the third section S3 and the fourth section S4 to improve access to the structure 20.

The structure 20 comprises a first element configured to be fixed to the third section S3 or the fourth section S4 and including means for injecting a mist of liquid particles. The structure 20 also comprises a second element configured to be fixed on the one hand to the first element and on the other hand to the other of the third section S3 and the fourth section S4. The first and second elements are disposed transversely with respect to the air passage duct. In other words, the first and second elements are disposed in line with the third section S3 and the fourth section S4, and therefore themselves able to constitute a section of the supply duct 10. The first and second elements are configured to form an at least partly vacant space between the first element and either the third section S3 or the fourth section S4 if the second element is disposed outside the air passage duct. The at least partly empty space formed by the removal of the second element of the structure 20 enables easy access to the first element which comprises the injection means subject to abrasion and therefore liable to be maintained or replaced regularly.

Figure 2:
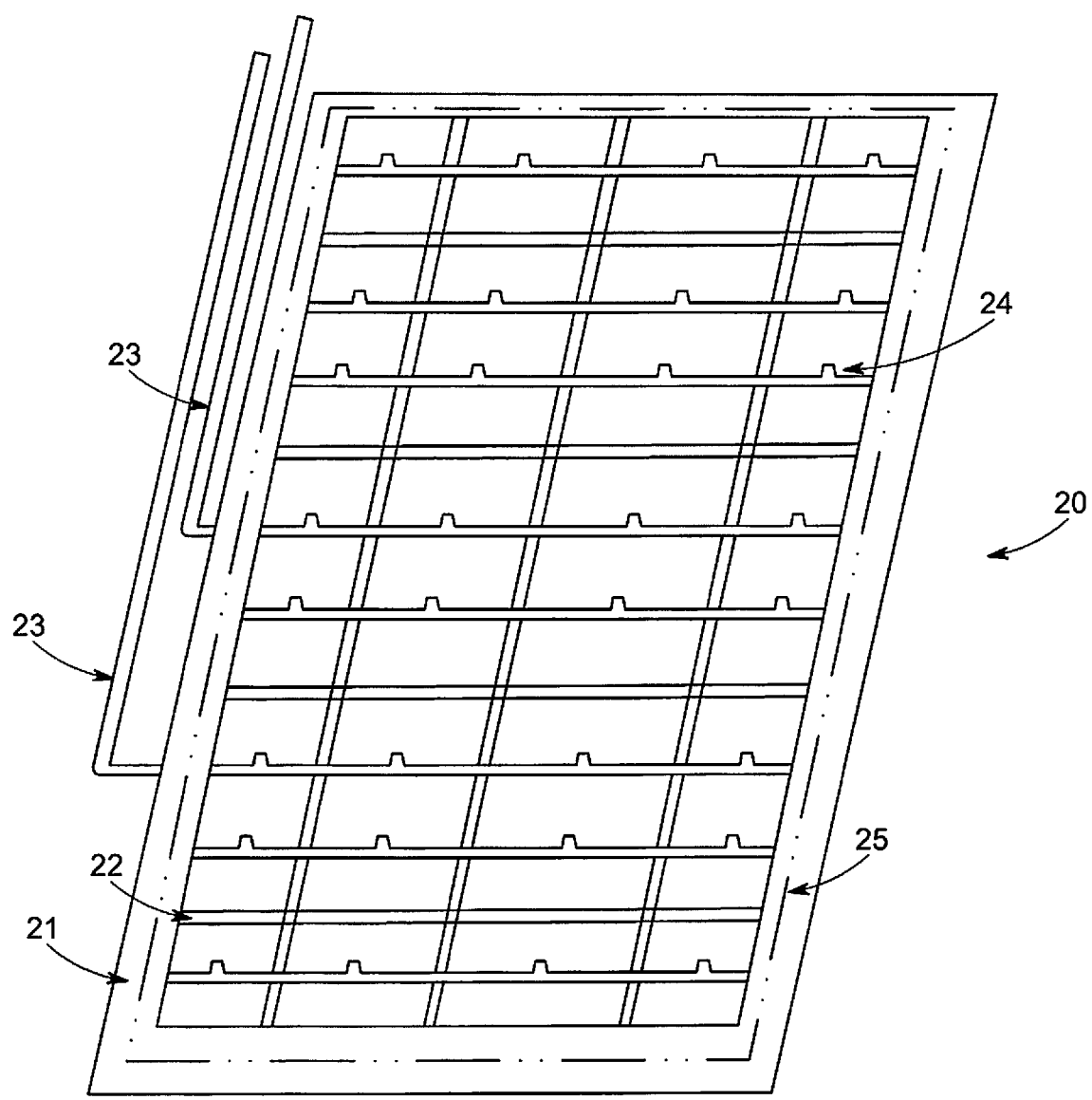
FIG. 2 represents one possible structure for generating a water mist.

As is represented in FIG. 2, the first element of the structure 20 comprises a frame 21 and a plurality of injection nozzles 24 fixed to the frame 21 to generate a mist of liquid particles in the inlet duct 10. Alternatively, the frame 21 may contain at least one nozzle 24. The first element of the structure 20 also comprises feed pipes 23 for liquid under pressure connected to the nozzle 24 or to the plurality of nozzles 24. The first element further comprises a plurality of supports 22 for the feed pipes 23 onto which the nozzles 24 are removably fixed. Moreover, the second element of the structure 20 comprises a spacer 25 intended to be fixed removably between the frame 21 and the third section S3 or the fourth section S4. In other words, the spacer 25 may be disposed above or below the frame 21 when the structure 20 is disposed between the third section S3 and the fourth section S4. The spacer 25 is symbolized by a chain-dotted line in FIG. 2. The functions of the spacer 25 are to enable the formation of an at least partly empty space when the spacer 25 is removed from the air passage duct and, in operation, to provide a seal between the frame 21 and the section of the inlet duct 10 to which it is fixed, i.e. the third section S3 or the fourth section S4. The spacer 25 may be in the form of a flexible seal or in any form enabling the above-mentioned functions to be provided. The spacer 25 extends at the periphery of the frame 21 around the direction A of circulation of the flow of air inside the third section S3 and the fourth section S4. The width of the spacer 25 extends substantially along the circulation direction A. This width defines the height of the empty space when the spacer 25 is removed from the air passage duct.

To enable the removal of the first element to form the empty space the first element can be moved in a first movement direction B and then in a second movement direction C to detach the first element from the third element S3 or where applicable the fourth element S4, i.e. the section to which it is fixed. The first movement direction B preferably extends substantially along the circulation direction A and the second movement direction C preferably extends substantially transversely relative to the circulation direction A. The second movement direction C may generally be any direction included in a plane transverse to the circulation direction A.

Moreover, the inlet duct 10 may include removable guide means 60 adapted to be inserted into the empty space formed by the second element, or spacer 25, to guide the first element in the first movement direction B and/or the second movement direction C. The guide means 60 may consist in a panel having a contact surface limiting friction or mobile elements such as balls or rollers enabling the movement of the first element to be facilitated. For example, the guide elements 60 may take the form of rails comprising fixing means for supporting the frame 21 of the first element and rollers in order to facilitate sliding of the frame 21 of the first element.

Moreover, the invention concerns a method of maintaining or demounting the structure 20 of an inlet duct 10 as described hereinabove. FIGS. 3a, 3b, 3c and 3d represent different steps of this maintenance method as applied to a first embodiment of the inlet duct 10 in which the first element, comprising in particular the frame 21, is disposed between the third section S3 and the second element, or spacer 25, while the second element is disposed between the first element and the fourth section S4. The retaining means 30 and the support 40 are not represented in FIG. 3a for clarity, although the latter are indeed present as can be seen in the subsequent FIGS. 3b to 3d.

Figure 3D:
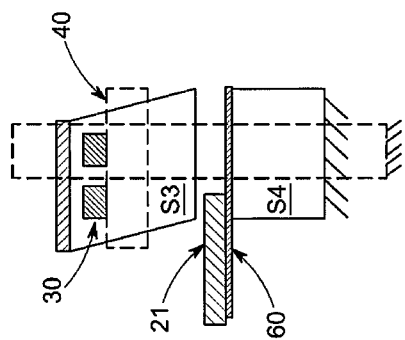
FIGS. 3a to 3d each represent a side view of a part of the inlet duct from FIG. 1 during various steps of a method of maintaining a structure from FIG. 2 of the inlet duct.
Figure 3C:
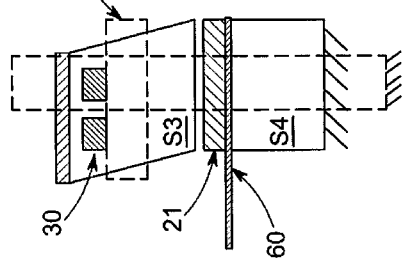
Figure 3B:
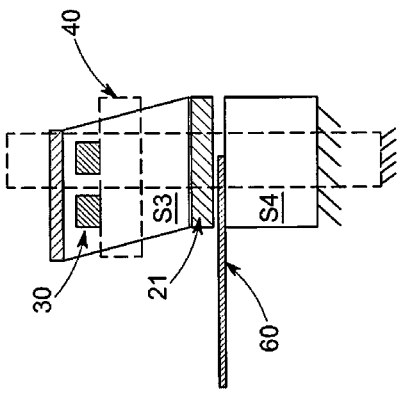
Figure 3A:
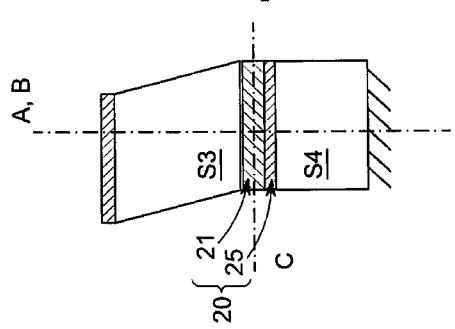

According to FIG. 3a, in the initial state the first and second elements are disposed between the third section S3 and the fourth section S4 so as themselves to constitute a section of the inlet duct 10.

In a subsequent step the result of which is represented in FIG. 3b the second element is removed in the first movement direction B so as to leave an empty space between the first element and the fourth section S4. Alternatively, if the second element were disposed between the first element and the third section S3 the empty space would be formed between the first element and the third section S3. Moreover, guide means 60 may optionally be installed in the empty space left by the second element to support and to guide the subsequent movement of the first element. The guide means 60 may be mounted on the fourth section S4, in order to be fixed thereto, or where applicable to the third section S3, in order to limit the number of parts to be installed when mounting the structure 20 in the inlet duct 10 and to avoid having mobile parts liable to be entrained by the reduced pressure generated by the flow of air in the inlet duct 10. A subsequent step, visible in FIG. 3c, consists in moving the first element in the first movement direction B so as to detach the first element from the third section S3 to which it is fixed. In other words, the first element is moved in the direction of circulation of air in the inlet duct 10. When the passage duct extends in a substantially vertical direction the first element is therefore moved toward the ground. Alternatively, if the first element were fixed to and in contact with the fourth section S4 this step would consist in moving the first element in a direction opposite the direction of circulation of air in the inlet duct 10 or away from the ground in the case of a substantially vertical passage duct. In the embodiment shown in which the guide means 60 are used the present step consists in moving the first element until it is in contact with or fixed to the guide means 60. This movement in the first movement direction B makes it possible for there no longer to be contact between the third section S3 and the second element, therefore facilitating the subsequent manoeuvring of the first element.

Then, as can be seen in FIG. 3*d*, the first element is moved in the second movement direction C so as to position the first element at least partly outside the air passage duct. The amplitude of the movement of the first element depends for example on the position of the nozzles 24 to be replaced or on the intended maintenance action. In this embodiment in which guide means 60 are used the first element is moved relative to the guide means 60 whilst remaining in contact therewith. This movement in the second movement direction C may be produced manually or by mechanical means such as a hoist.

Once the first element is at least partly disposed outside the air passage duct maintenance or replacement of the nozzles 24 may be carried out.

The movements of the first element in the first movement direction B and the second movement direction C therefore enable the operation of removing the structure 20 from the inlet duct 10 to be facilitated, thereby enabling replacement of the defective nozzles 24.

Figure 4:
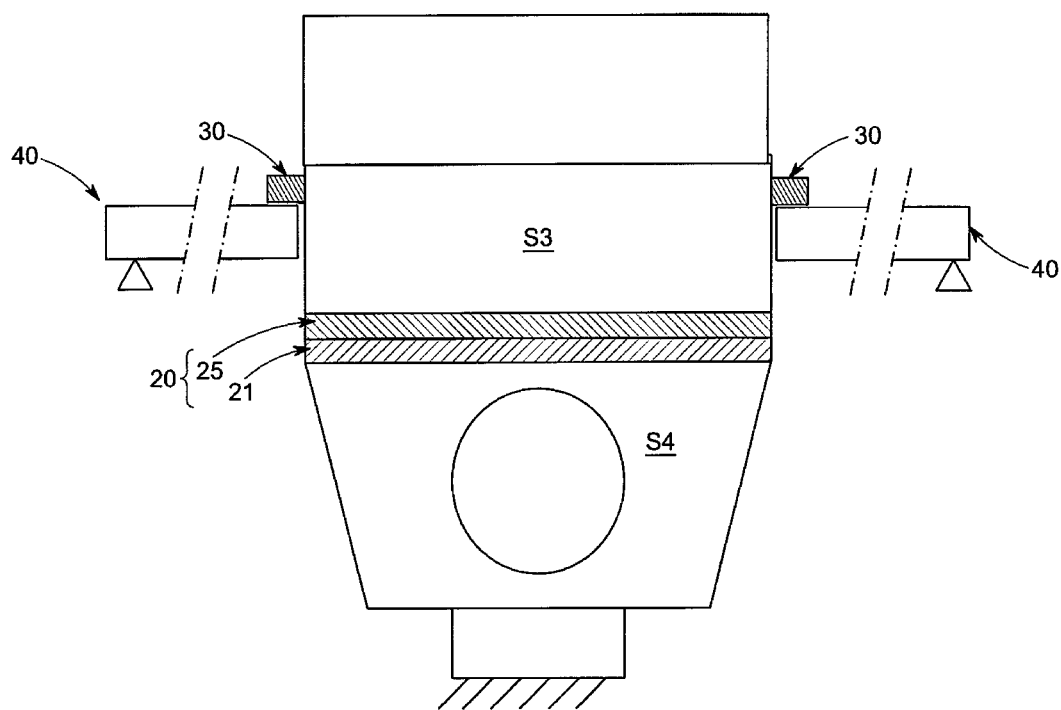
FIG. 4 represents a front view of the part of the inlet duct from FIGS. 3a to 3d in another embodiment of the inlet duct.

FIG. 4 shows a second embodiment of the inlet duct 10 that differs from the first embodiment of the inlet duct 10 shown in FIGS. 3*a* to 3*d* in that the first element of the structure 20 is disposed below the second element in the second embodiment. In other words, the positions of the first and second elements are interchanged with respect to one another relative to the first embodiment. The replacement or maintenance of the nozzles 24 present in the inlet duct 10 is therefore carried out in exactly the same manner as by the maintenance method described hereinabove except that the first element of the structure 20 is moved away from the ground in the first movement direction B. In other words, the first element is moved in the direction opposite to the direction of circulation of air in the inlet duct 10 to detach it from the fourth section S4. An additional step may therefore be added here and consist in moving the first element in the opposite sense in the first movement direction B to cause the first element to rest on the guide means 60. The first element can therefore be raised and then supported by the guide means 60 inserted beforehand between the fourth section S4 and the first element. The guide means 60 may preferably comprise support and fixing means together with sliding means such as a rail enabling movement of the first element in the second movement direction C. The sliding means may equally comprise means for fixing to the first element.

As indicated above, the second movement direction C may extend in any direction transverse to the direction of passage of air in the third section S3 and the fourth section S4. In particular, for better flexibility of the demounting operation and better accessibility to the first element, the second movement direction C may extend in a direction enabling the first element to be disposed on one side of the third section S3 or the fourth section S4.

It is possible to combine a plurality of embodiments without departing from the scope of the invention.

The advantages of the invention are to be found in the reduced complexity of the replacement or maintenance operations by enabling those operations to be carried out outside the inlet duct 10, in the most appropriate space around the plane substantially transverse to the inlet duct 10.

The invention claimed is:

1. An air inlet duct for a compressor of a gas or fuel oil turbine, comprising:
    two separate transition sections in fluid communication with one another for communication of a flow of air through said sections, each of said sections being self-supporting,
    a structure for injecting a mist of liquid particles, configured to be disposed between said sections and in contact with said sections, the structure being removable by sliding perpendicularly from between said sections relative to a direction of said flow of air, independently of demounting said sections,
    wherein said sections define an air passage duct of the inlet duct, the structure and said sections being configured to form an at least partly empty space between said sections when at least a part of the structure is disposed outside the air passage duct,
    wherein said structure comprises first and second elements disposed transversely relative to the air passage duct, the first element comprising means for injecting the mist of liquid particles and being configured to be fixed to a first of said sections, the second element being configured to be fixed on the one hand to the first element and on the other hand to a second of said sections, and in which the first and second elements are configured to form said at least partly empty space between the first element and said second of said sections when the second element is disposed outside the air passage duct,
    wherein said means for injecting the mist of liquid particles of the first element includes a frame, at least one injection nozzle fixed to the frame to generate the mist of liquid particles in the inlet duct, and at least one pressurized liquid feed pipe each connected to the at least one injection nozzle, and
    wherein the second element is a removable spacer.

2. The inlet duct according to claim 1, in which one section of the sections is disposed upstream of the other section of the sections relative to the direction of said flow of air inside the inlet duct.

3. The inlet duct according to claim 1, in which the structure and said sections are configured to form a completely empty space between said sections when the structure is disposed outside the air passage duct.

4. The inlet duct according to claim 1, in which the first element is able, after the spacer is positioned outside the air passage duct, to be moved in a first movement direction and then a second movement direction to detach the first element from the first section to which it is fixed.

5. The air inlet duct according to claim 4, in which the air passage duct defines the direction of said flow of air through the inlet duct, the first movement direction extending substantially along the direction of said flow of air and the second movement direction extending substantially transversely relative to the direction of said flow of air.

6. The air inlet duct according to claim 4, further comprising removable guide means adapted to be inserted in the at least partly empty space formed by the second element to guide the first element in the first movement direction and/or the second movement direction.

7. The inlet duct according to claim 1, in which one of said sections comprises:

a hollow body enabling the flow of air to pass through it;

retaining means forming a projection extending out of the hollow body;

a support configured to cooperate with the retaining means to transmit a load from the one of said sections to the ground.

8. The inlet duct according to claim 7, in which the support is a gas turbine protection thermo-acoustic enclosure, or a portion of a structure of a building in which the gas turbine and the inlet duct are placed, or a framework.

9. A method of maintaining a structure of an inlet duct, the inlet duct including:

two separate transition sections in fluid communication with one another for communication of a flow of air through said sections, each of said sections being self-supporting, a structure for injecting a mist of liquid particles, configured to be disposed between said sections and in contact with said sections, the structure being removable by sliding perpendicularly from between said sections relative to a direction of said flow of air, independently of demounting said sections, wherein said sections define an air passage duct of the inlet duct, the structure and said sections being configured to form an at least partly empty space between said sections when at least a part of the structure is disposed outside the air passage duct, wherein said structure comprises first and second elements disposed transversely relative to the air passage duct, the first element comprising means for injecting the mist of liquid particles and being configured to be fixed to a first of said sections, the second element being configured to be fixed on the one hand to the first element and on the other hand to a second of said sections, and in which the first and second elements are configured to form said at least partly empty space between the first element and said second of said sections when the second element is disposed outside the air passage duct, wherein said means for injecting the mist of liquid particles of the first element includes a frame, at least one injection nozzle fixed to the frame to generate the mist of liquid particles in the inlet duct and at least one pressurized liquid feed pipe each connected to the at least one injection nozzle, and wherein the second element is a removable spacer, wherein said method comprises the steps of:

removing the second element so as to leave the at least partly empty space between the first element and said second section, moving the first element in a first movement direction so as to detach the first element from said first section, moving the first element in a second movement direction so as to position the first element at least partly outside the air passage duct.

10. The maintenance method according to claim 9, further comprising, before the step of moving the first element, a step including installing guide means in the at least partly empty space left by the spacer, the frame being moved in the second movement direction in contact with the guide means.

11. The maintenance method according to claim 9, further comprising a step of replacing the at least one nozzle when the frame is positioned outside the air passage duct.

12. A gas or fuel oil turbine assembly comprising:

an air inlet duct including:

two separate transition sections in fluid communication with one another for communication of a flow of air through said sections, each of said sections being self-supporting, a structure for injecting a mist of liquid particles, configured to be disposed between said sections and in contact with said sections, the structure being removable by sliding perpendicularly from between said sections relative to a direction of said flow of air, independently of demounting said sections, wherein said sections define an air passage duct of the inlet duct, the structure and said sections being configured to form an at least partly empty space between said sections when at least a part of the structure is disposed outside the air passage duct, wherein said structure comprises first and second elements disposed transversely relative to the air passage duct, the first element comprising means for injecting the mist of liquid particles and being configured to be fixed to a first of said sections, the second element being configured to be fixed on the one hand to the first element and on the other hand to a second of said sections, and in which the first and second elements are configured to form said at least partly empty space between the first element and said second of said sections when the second element is disposed outside the air passage duct, wherein said means for injecting the mist of liquid particles of the first element includes a frame, at least one injection nozzle fixed to the frame to generate the mist of liquid particles in the inlet duct and at least one pressurized liquid feed pipe each connected to the at least one injection nozzle, and wherein the second element is a removable spacer, said gas or fuel oil turbine assembly further comprises:

a compressor connected to the air inlet duct to receive the flow of air therefrom, a combustion chamber for mixing and burning a fuel and air compressed by the compressor, an expansion turbine adapted to be driven in rotation by hot gases from the combustion chamber, and an alternator coupled to the expansion turbine to generate electricity.

* * * * *